Figure 1:
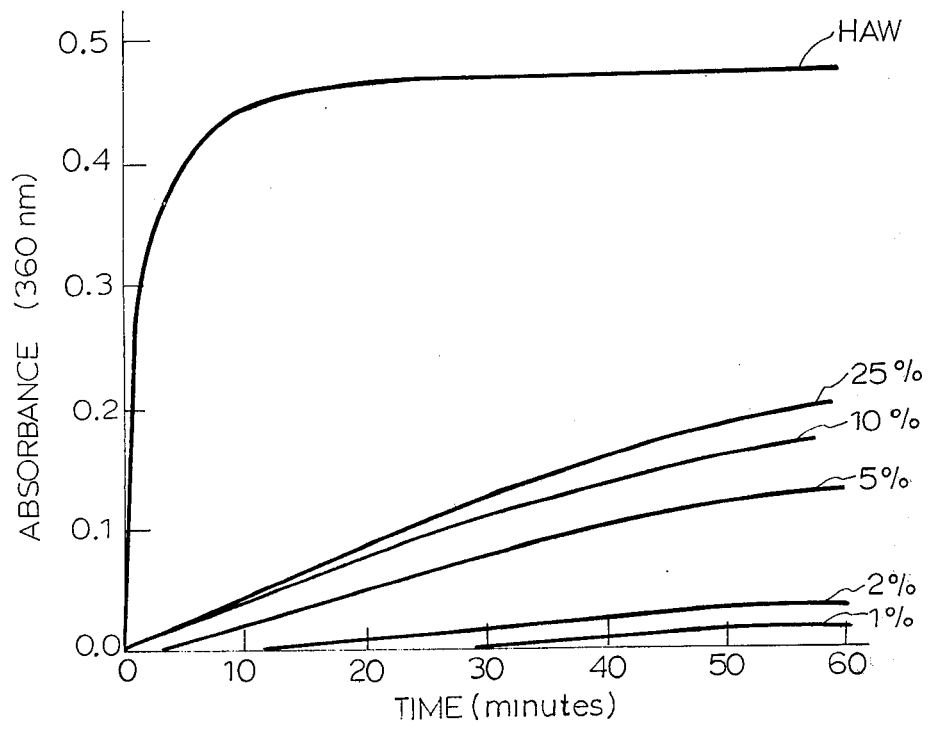

United States Patent [19]

Hensarling et al.

[11] 3,941,764

[45] Mar. 2, 1976

[54] USE OF ACIDIC HEXANE TO PROCESS OIL SEEDS FOR PROTEIN AND OIL

[75] Inventors: Thomas P. Hensarling; Thomas J. Jacks, both of Metairie; Lawrence Y. Yatsu, New Orleans, all of La.

[73] Assignee: The United States of America as represented by the Secretary of Agriculture, Washington, D.C.

[22] Filed: May 10, 1974

[21] Appl. No.: 468,951

[52] U.S. Cl. ........ 260/123.5; 260/412.3; 260/412.4; 260/412.8; 426/430; 426/656
[51] Int. Cl.² .... A23J 1/14; C07G 7/00; C11B 1/04; A23J 7/02
[58] Field of Search.......... 260/412.4, 412.3, 412.8, 260/426, 123.5; 426/430, 429

[56] References Cited
UNITED STATES PATENTS

| | | | |
|---|---|---|---|
| 1,244,995 | 10/1917 | Loomis | 260/412.3 |
| 2,200,391 | 5/1940 | Freeman | 260/412.4 |
| 2,484,831 | 10/1949 | Hutchins et al. | 260/412.4 |
| 2,605,271 | 7/1952 | Hunn et al. | 260/412.4 |
| 3,557,168 | 1/1971 | Pons, Jr. et al. | 260/412.4 |

*Primary Examiner*—Winston A. Douglas
*Assistant Examiner*—P. E. Konopka
*Attorney, Agent, or Firm*—M. Howard Silverstein; Max D. Hensley

[57] ABSTRACT

Hexane and mixtures of hexane containing 2 to 25% acetic acid (v/v) were used to prepare oil and protein from glanded cottonseed by solvent extraction. As the amount of acetic acid in the solvent increased, the amounts of total lipid, phospholipid, neutral oil, and gossypol in each miscella increased, but the amount of free fatty acids did not change significantly. The solubility of the protein in 0.02N NaOH did not decrease until the amount of acetic acid in the solvent used to prepare each meal increased to a point between 4 and 10 percent. The drainage of the miscella (solvent-lipid solution) through the marc (insoluble residue) was much more rapid when the solvent was hexane-acetic acid than when it was hexane alone.

2 Claims, 2 Drawing Figures

USE OF ACIDIC HEXANE TO PROCESS OIL SEEDS FOR PROTEIN AND OIL

This invention relates to a process for preparing protein and oil from oilseeds. Specifically, this invention relates to the use of acidified hexane for preparing protein and oil from oilseeds. More specifically, this invention relates to the use of hexane-acetic acid for preparing protein and oil from cottonseed. This invention can be used to separate lipids from non-lipids.

The primary object of this invention is to provide a process for preparing protein and oil from oilseeds in a more efficient manner than currently employed.

A second object of this invention is to provide a method for extracting more lipids from any tissue in a more efficient manner than currently employed.

Another object of this invention is to provide a method for separating oilseed miscella from marc more rapidly than by methods previously employed.

Hexane is the solvent used commercially to extract oil from cottonseed. However, mixtures of solvents greatly differing in polarity have been used for several years to more completely extract tissue lipids. In the Journal of Biological Chemistry 17, 377–384 (1914), W. R. Bloor introduced a mixture of alcohol and ether that combined "the penetrating power of alcohol with the greater solvent power of ether". This medium was widely used in laboratories until J. Folch, et al. introduced chloroform-methanol in the Journal of Biological Chemistry 191, 833–841 (1951). Although industrial use of mixed solvents has been minimal, extraction of cottonseed with such mixed solvents as hexaneacetone-water and chloroform-methanol have been explored. In the Journal of the American Oil Chemists' Society 38, 19–21 (1961), W. H. King, et al. reported the use of a hexane-acetone-water azeotrope for the extraction of cottonseed. Jacks, et al. reported in the Journal of the American Oil Chemists' Society 47, 222–223 (1970), that the solvent mixtures, hexane-acetone-water and chloroform-methanol, each extracted more neutral lipid from cottonseed than hexane alone. However, the oil extracted with the mixed solvents contained more nonneutral lipid contaminants than the oil extracted with hexane alone. Jacks, et al. showed in the Journal of the American Oil Chemists' Society 50, 72–73 (1973), that the hexane-acetone-water solvent mixture disrupts pigment glands and produces a miscella containing amounts of pigment prohibitive to commercial applications.

We have now discovered a mixed solvent system that extracts more lipid from cottonseed than hexane alone without disrupting pigment glands or extracting amounts of pigment prohibitive to commercial applications. By the method of the instant invention a new mixed solvent consisting of industrial hexane (Skellysolve B) containing an acid is used to separate lipids from non-lipids. This mixed solvent may be used to extract preferred lipids from cottonseed (glanded or glandless varieties), other oilseeds, or other biological tissues.

Figure 2:
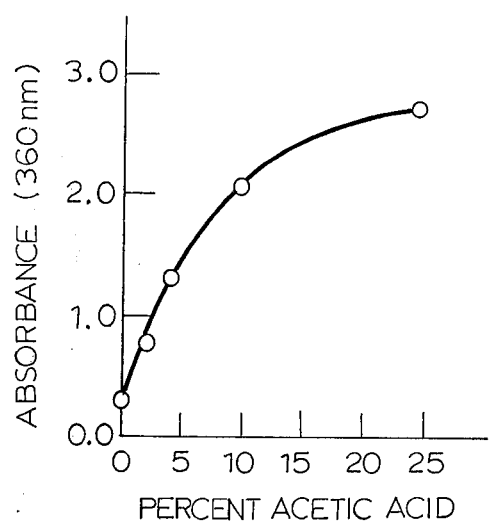

Hydrophilic cytoplasmic components tend to present barriers to movement of lipophilic liquids through oilseed tissues. Of these components, membranous elements of the cytoplasm are labile in acidic aqueous solvents. Therefore, acidification of oil solvents, in this case industrial hexane, improved extraction of lipids during processing of oilseeds by increasing the permeability of membranes to solvents and lipidsolvent mixtures. Results of extracting comminuted cottonseed meats with mixtures of hexane-acetic acid showed that these mixtures extracted from 3 to over 4% more neutral oil than did hexane alone. Greater amounts of other lipodial constituents were also obtained, but depending on time of contact and concentration of acetic acid, relatively few pigment glands were disrupted by the solvent-acid mixtures (FIGS. 1 and 2). Those features indicated that acidified hexane should be especially suitable for the liquid cyclone process where glands are separated from other parts of tissue during extraction of oil.

Our results indicated that 10% acetic cid in hexane would be the desired upper limit of acidification for commercially extracting oil from glanded cottonseeds. At concentrations of 10% acetic acid and above both oil and marc were colored. Also some hexane-acetic acid mixtures of concentrations below 10% are azeotropic [Horsley, L.H., "Azeotropic Data," Advances in Chemistry Series, No. 6, American Chemical Society, Washington, D.C. (1952)]. However, the higher levels of acidification might be useful in extraction of lipids from glandless cottonseed, other oilseeds, or other tissues.

Since glanded meats were used in this study, the property of acidified hexane to rupture pigment glands was examined. Isolated glands were treated with hexane-acetone-water, which readily disrupts pigment glands, and with mixtures of hexane and acetic acid. Absorbancies at 360 nm of miscellae during one hour of contact (FIG. 1) indicated that glands were slowly ruptured in hexane containing 5% or more acetic acid. However, even after one hour of contact, less than half of the glands were disrupted by hexane containing 25% acetic acid. In addition, the effect of acidified hexane on glands in the dry-milled meats was examined. Absorbancies of miscellae obtained from extractions of these meats, shown in FIG. 2, indicated that amounts of pigment in miscellae also increased as concentrations of acetic acid in hexane increased.

Abilities of mixtures of hexane and acetic acid to extract lipoidal materials from glanded cottonseed were compared to that of hexane. Two grams of dry-milled meats were extracted three times with 6 ml of fresh solvent, and the miscellae were combined. Amounts of miscellar components extracted by each solvent are presented in Table I. The results show that as the amount of acetic acid in the hexane increased, the amounts of total lipid, phospholipid(phosphorus), gossypol and neutral oil in each miscella increased. The amount of free fatty acids did not change significantly.

Effects of acidified hexane on proteins of cottonseed were examined by determining acidities of extracted meals and solubilities of proteins in 0.02N NaOH. Results presented in Table II indicated that acetic acid was apparently bound in the meals even after the meals had been dried in vacuo. Therefore, to comparatively determine solubilities of proteins of each meal in alkali, the pH of each meal had to be adjusted to an arbitrarily chosen standard value, in this case pH 7.0. Table II shows the milliequivalents of base required for this neutralization of each suspension of 1 g of meal. Protein solubility of each neutralized meal in 0.02N NaOH is also shown in Table II. Apparently, contact of cottonseed tissue with hexane containing at least 10% acetic acid rendered some of the protein insoluble in alkali.

Since the presence of acetic acid in hexane makes the solvent corrosive, effects of acidic hexane on equipment materials were investigated. After being in continuous contact with hexane containing 2% acetic acid for 28 days, stainless steel, Teflon and polyethylene were not affected except for slight swelling of the plastics. However, soft steel copper, and galvanized metal developed coatings. These observations indicate that use of acidic hexane would not be a problem in cottonseed processing if the proper materials were used for the processing equipment.

Another result of using hexane-acetic acid mixtures was that drainage of the miscella through the marc was much more rapid when the solvent was acidic hexane than when it was hexane alone. Since separation of miscella and marc is often a limiting factor in many commercial processes, use of acidic hexane might greatly increase the volume of material processed.

Extracting media were industrial hexane (Skellysolve B) and industrial hexane containing from 2 to 25% (v/v) glacial acetic acid. The latter mixture was homogeneous and monophasic.

Dehulled glanded cottonseed meats were dry-milled in a sieveless Alpine American Counterplex (impact stud mill) with counter-rotating discs having speeds of 9500 and 2500 rpm. The resultant particles were stored over phosphorus pentoxide ($P_2O_5$) in vacuo. Samples of the dried particles were stirred continuously with extracting media in fritted glass Buchner funnels of medium porosity (6 ml solvent per 2 g meats; 5 min contact), and resultant miscellae were collected by filtration with reduced pressure for 2 min. Each marc was re-extracted twice with fresh solvent, and the three miscellae obtained from each sample were combined. Weights of the extracted lipids were determined after solvents were removed in vacuo.

EVALUATIONS:

Amounts of neutral oil in the miscellae were determined by a modification of methods described previously: W. S. Singleton, et al., Journal of the American Oil Chemists' Society, 43, 592 (1963), and T. J. Jacks, et al., Journal of the American Oil Chemists' Society, 47, 222 (1970). In addition, the oil was dissolved in acetone and filtered to remove a slightly yellow hue and a small amount of finely suspended matter that was soluble in hexane but not in the oil or acetone. This particulate matter was especially evidenced in miscellae produced with hexane containing high concentrations of acetic acid.

Contents of free fatty acids in miscellae were determined by titration according to the A.O.C.S. Official Method Ca 5a–40 (1964 rev.) except that the indicator Nile Blue was substituted for phenolphthalein to overcome the difficulty of observing red color changes in a reddish milieu.

Phosphorus in the extracted lipids was determined by the Fiske-Subbarow colormetric method [Fiske, C. H. and Y. Subbarow, Journal of Biological Chemistry 66, 375 (1925)], after digestion of materials as described by T. J. Jacks, et al., in the Journal of the American Oil Chemists' Society 47, 222-223 (1970).

Contents of gossypol in miscellae were estimated from absorbancies at 350 nm, due to gossypol pigments [C. H. Boatner, Cottonseed and Cottonseed Products, Edited by A. C. Bailey, Interscience Publishing, Inc., N.Y., 1948, p. 258] determined spectrophotometrically as described by L. Y. Yatsu, et al., in the Journal of the American Oil Chemists' Society, 47, 73 (1970).

Solubility of protein in oil-free meals was determined as follows: After being dried in vacuo, 1 g of meal was suspended by sonication for 15 sec in 30 ml of $H_2O$ containing 4 drops of Dow Corning Antifoam B (antifoaming agent). The mixture was adjusted to pH 7.0 with 1.0 N NaOH, 0.8 ml of 1.0N NaOH was then added, and the suspension was diluted to 40 ml with $H_2O$. The mixture was sonicated for 15 sec, continuously mixed by shaking for 1 hr, and then centrifuged at 18,000 × g for 10 min. Nitrogen content of the supernatant was determined by the procedure of Minari and Zilversmit [Minari, O. and D. E. Zilversmit, Analytical Biochemistry 6, 320 (1963)].

Abilities of solvents to rupture pigment glands were estimated from amounts of pigments in miscellae obtained from isolated glands. Dried glands, prepared as described by T. J. Jacks, et al., in the Journal of the American Oil Chemists' Society 50, 72(1973), were mixed with solvents (50 ml solvent per 2 mg glands) and occasionally shaken. Absorbancies of miscellae at 360 nm were determined during one hr of contact. Hexane in the solvents was spectrograde quality. The content of acetic acid in the solvents had no effect on the absorbance of purified gossypol at 360 nm.

The following examples are provided to illustrate the preferred embodiments of this invention and should not be construed as limiting the invention in any manner whatever.

EXAMPLE 1

Dehulled glanded cottonseed meats were dry-milled in a sieveless Alpine American Counterplex (impact stud mill) with disc speeds at 9500 and 2500 rpm. The resultant particles were stored over $P_2O_5$ in vacuo. Two grams of the dried particles were stirred continuously with 6 ml of industrial hexane (Skellysolve B) for 5 minutes in a fritted glass Buchner funnel of medium porosity. The resultant miscella was collected by filtration with reduced pressure for 2 min. The marc (extracted residue) was re-extracted twice with fresh solvent and the three miscellae were combined. It was noted that the filtration of these miscellae through the marc was much slower than the filtration of the miscellae containing hexane and acetic acid. The solvent was removed in vacuo and the amounts of total lipid, phosphorus, gossypol, free fatty acids, and neutral oil in the miscella were determined. These amounts are shown in Table I. The solubility of the protein in the marc was determined and is shown in Table II.

EXAMPLE 2

Dehulled glanded cottonseed meats were dry-milled in a sieveless Alpine American Counterplex (impact stud mill) with disc speeds at 9500 and 2500 rpm. The resultant particles were stored over $P_2O_5$ in vacuo. Two grams of the dried particles were stirred continuously with 6 ml of industrial hexane (Skellysolve B) containing 2% (v/v) acetic acid for 5 minutes in a fritted glass Buchner funnel of medium porosity. The resultant miscellae was collected by filtration with reduced pressure for 2 min. The marc was re-extracted twice with fresh solvent and the three miscellae were combined. The solvent was removed in vacuo, and the amounts of total lipid, phosphorus, gossypol, free fatty acids, and neutral oil in the miscella were determined. These amounts are shown in Table I. The solubility of the protein in the extracted meats was determined and is shown in Table II.

EXAMPLE 3

Dehulled glanded cottonseed meats were dry-milled in a sieveless Alpine American Counterplex (impact stud mill) with disc speeds at 9500 and 2500 rpm. The resultant particles were stored over $P_2O_5$ in vacuo. Two grams of the dried particles were stirred continuously with 6 ml of industrial hexane (Skellysolve B) containing 4% (v/v) acetic acid for 5 minutes in a fritted glass Buchner funnel of medium porosity. The resultant miscella was collected by filtration with reduced pressure for 2 min. The marc was re-extracted twice with fresh solvent, and the three miscellae were combined. The solvent was removed in vacuo and the amounts of total lipid, phosphorous, gossypol, free fatty acids, and neutral oil in the miscella were determined. These amounts are shown in Table I. The solubility of the protein in the extracted meats was determined and is shown in Table II.

EXAMPLE 4

Dehulled glanded cottonseed meats were dry-milled in a sieveless Alpine American Counterplex (impact stud mill) with disc speeds at 9500 and 2500 rpm. The resultant particles were stored over $P_2O_5$ in vacuo. Two grams of the dried particles were stirred continuously with 6 ml of industrial hexane (Skellysolve B) containing 10% (v/v) acetic acid for 5 minutes in a fritted glass Buchner funnel of medium porosity. The resultant miscella was collected by filtration with reduced pressure for 2 min. The marc was re-extracted twice with fresh solvent and the three miscellae were combined. The solvent was removed in vacuo, and the amounts of total lipid, phosphorous, gossypol, free fatty acids, and neutral oil in the miscella were determined. These amounts are shown in Table I. The solubility of the protein in the extracted meats was determined and is shown in Table II.

EXAMPLE 5

Dehulled glanded cottonseed meats were dry-milled in a sieveless Alpine American Counterplex (impact stud mill) with disc speeds at 9500 and 2500 rpm. The resultant particles were stored over $P_2O_5$ in vacuo. Two grams of the dried particles were stirred continuously with 6 ml of industrial hexane (Skellysolve B) containing 25% (v/v) acetic acid for 5 minutes in a fritted glass Buchner funnel of medium porosity. The resultant miscella was collected by filtration with reduced pressure for 2 min. The marc was re-extracted twice with fresh solvent and the three miscellae were combined. The solvent was removed in vacuo, and the amounts of total lipid, phosphorous, gossypol, free fatty acids, and neutral oil in the miscella were determined. These amounts are shown in Table I. The solubility of the protein in the extracted meats was determined and is shown in Table II.

TABLE I

| | COMPONENTS OF MISCELLA FROM 2g OF MEATS[a] | | | | |
|---|---|---|---|---|---|
| Percent of Acetic Acid in Hexane (v/v) | Total Lipid[b] mg | Phosphorus mg | Gossypol mg | Free Fatty Acids mg | Neutral Oil mg |
| 0 | 686 ± 6.2 | 0.12 | 0.21 | 15.9 ± 0.8 | 612 ± 4.0 |
| 2 | 709 ± 2.2 | 0.37 | 0.63 | 19.0 ± 0.4 | 629 ± 0.6 |
| 4 | 716 ± 3.5 | 0.60 | 0.98 | 18.8 ± 0.4 | 631 ± 1.1 |
| 10 | 740 ± 3.0 | 1.05 | 1.57 | 17.0 ± 0.7 | 639 ± 4.1 |
| 25 | 753 ± 6.7 | 1.22 | 2.02 | 16.3 ± 0.7 | 632 ± 7.5 |

[a] Values represent means ± standard deviations from the means. No standard deviations are shown when the deviations were so small as to be essentially "0".
[b] Total lipid is all materials in miscella after evaporation of solvent.

TABLE II

| | PROPERTIES OF MEALS FROM EXTRACTED MEATS | | | |
|---|---|---|---|---|
| Percent of Acetic Acid in Hexane (v/v)[a] | pH of Aqueous Suspension[b] | mE of Base for Neutralization | Soluble Protein per g of Meal | |
| | | | mg | % of "0" |
| 0 | 6.0 | 0.96 | 725 | — |
| 2 | 5.85 | 0.98 | 725 | 100 |
| 4 | 5.85 | 0.99 | 725 | 100 |
| 10 | 5.3 | 1.21 | 662 | 91.3 |
| 25 | 5.0 | 1.445 | 488 | 67.3 |

[a] Solvent used to prepare meal from meats.
[b] One g of dried meal in 30 ml of $H_2O$.

We claim:

1. A process for preparing protein and oil from oilseeds, the process comprising:
   a. preparing a homogeneous, monophasic mixture comprising hexane and about from 2% to 25% acetic acid,
   b. adding about from 3 ml to 12 ml of the mixture of (a) per 1 gram of comminuted oilseeds,
   c. stirring the mixture of (b) at room temperature for about from 2 minutes to 4 hours to insure contact of mixture (a) with the comminuted oilseed particles, thereby forming a suspension of marc in an oil-containing, homogeneous, monophasic miscella, and
   d. separating the miscella from the marc produced in step (c), thereby obtaining the proteinaceous marc and the oil-containing, homogeneous, monophasic miscella.

2. The process of claim 1 wherein the mixture of step (a) consists of hexane and about from 2% to 25% acetic acid, and wherein the oilseed is glanded cottonseed.

* * * * *